United States Patent
Suokas

(10) Patent No.: US 9,586,694 B2
(45) Date of Patent: Mar. 7, 2017

(54) SAFETY ARRANGEMENT FOR AIRCRAFT AND METHOD FOR DETERMINING TYPE OF THE LANDING SURFACE FOR AN AIRCRAFT

(71) Applicant: SUOKAS AVIONICS OY, Lahti (FI)

(72) Inventor: Aki Suokas, Lahti (FI)

(73) Assignee: SUOKAS AVIONICS OY, Lahti (FI)

( * ) Notice: Subject to any disclaimer, the term of this patent is extended or adjusted under 35 U.S.C. 154(b) by 81 days.

(21) Appl. No.: 14/618,198

(22) Filed: Feb. 10, 2015

(65) Prior Publication Data

US 2016/0244183 A1 Aug. 25, 2016

(30) Foreign Application Priority Data

Feb. 11, 2014 (FI) ..................................... 20145131

(51) Int. Cl.
| | |
|---|---|
| *B64D 45/08* | (2006.01) |
| *B64D 45/04* | (2006.01) |
| *B64C 35/00* | (2006.01) |
| *B64C 25/66* | (2006.01) |
| *B64D 45/00* | (2006.01) |

(52) U.S. Cl.
CPC .............. *B64D 45/04* (2013.01); *B64C 25/66* (2013.01); *B64C 35/008* (2013.01); *B64D 45/0005* (2013.01)

(58) Field of Classification Search
CPC ...... B64D 45/04; B64C 25/66; B64C 45/0005
See application file for complete search history.

(56) References Cited

U.S. PATENT DOCUMENTS

| | | | |
|---|---|---|---|
| 4,516,124 A | 5/1985 | Shannon | |
| 6,012,001 A | 1/2000 | Scully | |
| 2003/0011493 A1 | 1/2003 | Wiplinger | |
| 2006/0226286 A1 | 10/2006 | Hawkins | |
| 2010/0017050 A1* | 1/2010 | Watts | B64D 45/04 701/16 |
| 2012/0229325 A1* | 9/2012 | Dutruc | G01S 7/03 342/29 |
| 2013/0127642 A1* | 5/2013 | Maggiore | G08G 5/0008 340/947 |

(Continued)

FOREIGN PATENT DOCUMENTS

| | | |
|---|---|---|
| EP | 1586969 | 10/2005 |
| JP | 2008-203123 | 9/2008 |

*Primary Examiner* — Khoi Tran
*Assistant Examiner* — Dale Moyer
(74) *Attorney, Agent, or Firm* — Young & Thompson

(57) ABSTRACT

A safety arrangement for an aircraft, especially for amphibious aircraft, being configured for determining a type of landing surface (such as water/solid ground) and including: two transceivers (301, 302); the first transceiver (301) configured to operate on first electromagnetic wavelength and the second transceiver (302) configured to operate on second electromagnetic wavelength differing from the first wavelength, and at least one of transceivers is configured to receive the reflections electromagnetic wavelengths, and determining element for determining the type of the landing surface based on the properties of two electromagnetic wavelengths reflected from the landing surface and for outputting a signal indicating the type of the determined landing surface.

17 Claims, 2 Drawing Sheets

(56) References Cited

U.S. PATENT DOCUMENTS

2013/0289803 A1\* 10/2013 Piccolo ................. G01B 21/30
　　　　　　　　　　　　　　　　　　　　　　701/3
2015/0274317 A1\* 10/2015 Suokas ............. B64D 45/0005
　　　　　　　　　　　　　　　　　　　　　　73/178 T \* cited by examiner

SAFETY ARRANGEMENT FOR AIRCRAFT AND METHOD FOR DETERMINING TYPE OF THE LANDING SURFACE FOR AN AIRCRAFT

TECHNICAL FIELD OF THE INVENTION

The invention relates to a safety arrangements for an aircraft and a method for determining the type of the landing surface for an aircraft. Especially the invention relates to amphibious aircraft.

BACKGROUND OF THE INVENTION

Aircrafts require a landing gear for landing and taking-off. Term aircraft relates to all kinds of fixed-wing and rotary-wing aircraft. Airplanes are fixed-wing aircrafts that conventionally land on and take-off on runways. Land airplanes (operate on land or solid ground) comprise fixed or retractable landing gear. The retractable landing gear is retracted inside the fuselage to reduce an aerodynamic drag after the take-off or during the flight. (However fixed landing gear is not retractable.) The retractable landing gear must be deployed or in landing position when landing on the runway.

A seaplane is a powered fixed-wing aircraft capable of taking off and landing (alighting) on water. Seaplanes are either flying boats or floatplanes. In a flying boat, the main source of buoyancy is the fuselage, which acts like a ship's hull in the water because the fuselage's underside has been hydrodynamically shaped to allow water to flow around it. A floatplane has slender pontoons, or floats, mounted under the fuselage. Two floats are common, but other configurations are possible. Only the floats of a floatplane normally come into contact with water. The fuselage remains above water.

However, there are also amphibious airplanes and they can operate on ground (runways) or water. Amphibious airplanes comprise a conventional wheeled type landing gear for landing on ground and pontoon structures or "floats" for water landing. For landing on runways or ground, the conventional landing gear must be in landing position or landing configuration so that it is extended below the airplanes pontoon structures. And for landing on water, this landing gear must be retracted, so that landing on water happens with pontoons/floats. In such case landing gear is typically retracted inside the fuselage, wings or pontoons. Thereby amphibious airplanes have two configurations for landing gear depending on the landing surface type.

When amphibian (amphibious aircraft) lands on ground with landing wheels retracted, the plane will make contact with the runway with pontoons. This causes some damage to the parts of the plane and to the pilot's self-esteem. Usually the damages are minor in such case.

On the other hand, when the amphibian is landing on water and the landing gear is extended, the aircraft will typically flip forward into the water upon the landing gear's contact with the water. This causes damage to the aircraft and injury to the crew and passengers. The damages to the amphibian in such event are usually severe: The plane will decelerate and stop within very short distance, flip over on its back into the water. Damages are caused by the rapid deceleration, water entering electronic equipment and engine while it is running. Such damages can result in scrapping the plane completely.

One of the biggest causes for accidents and the largest source of insurance claims for amphibious aircraft are related to the improper landing gear configuration when landing on a certain type landing surface. Amphibian pilots are particularly susceptible to committing gear status errors due to the difference in the proper gear status for any landing surface; any pilot can make such a mistake.

Therefore, amphibians nowadays comprise different type warning systems to help the pilot to take care of proper landing gear configuration when landing an amphibious aircraft.

From the prior art is known U.S. Pat. No. 4,516,124, which discloses an advisory system for the pilot of an amphibious aircraft with retractable landing gear for checking the status of the landing gear. The apparatus senses changes in aircraft speed indicative of an imminent landing and prompts the pilot to verify that the landing gear is in a position compatible with the type of surface, land or water, chosen for landing.

From the prior art is also known US2006226286, which discloses system for controlling landing gear of an aircraft. The system comprises a sensor for sensing water, and the sensor is coupled to the landing gear to retract so as to retract the landing gear when the sensor senses a body of water. The system operates during the contact of landing and operates as kind of anti-flip system.

From the prior art is also known US2003011493, which discloses an aircraft landing gear warning apparatus. The apparatus comprises a computer operatively connected to a surface monitor and a gear-status warning indicator. Preferably the surface monitor is a laser distance measuring system. However any sensing subsystem which is capable of determining the altitude of the aircraft is suitable, although preferably the sensing subsystem also indicates the landing surface (e.g., ground or water). The computer also accepts an input from the gear status sensors to determine if the landing gear is extended or retracted. If the system senses a water surface and the landing gear is down, a warning alerts the pilot that the landing gear is in the incorrect configuration.

In an embodiment of US2003011493, the surface monitor is comprised of two laser distance-measuring systems. A first laser distance measuring system is used to emit a narrow laser beam, which provides a good return when reflected off of land. A second laser distance measuring system is used to emit a spread laser beam, which provides a good return when reflected off of water. In operation both the first and second laser distance measuring systems would emit laser beams continuously.

There are however some disadvantages relating to the known prior art, such as still occurring accidents caused by improper landing gear configuration when landing, despite of the presence of warning or advisory systems. A major portion of amphibious aircraft landing accidents is caused by improper landing gear configuration/position during landing.

The drawback of advisory systems, like U.S. Pat. No. 4,516,124, is that they operate every time plane is landing or about to land and require pilot input for selecting the landing surface type. This causes that the pilot has to manually operate the system every time, which creates an autonomic reactions to silence the system without consciously making the selections for the respective landing surface type.

Another drawback for anti-flip systems for preventing the flipping the amphibian, is that these systems operate at the moment of the contact with landing surface. This means that pilot error has already occurred. In such case the outcome depends on the operation and reliability of the anti-flip system.

Yet another drawback relates to warning systems that are comprised of two laser-distance measuring systems, of which first one emits narrow laser beam and second one emits spread laser beam. These systems may give erroneous warnings when there is water on runway or when landing on shallow water and bottom reflects a confusing signal. Furthermore, these systems are susceptible for dirt that causes weakening of the signal or the measurement.

SUMMARY OF THE INVENTION

An object of the invention is to alleviate and eliminate the drawbacks relating to the known prior art. Especially the object of the invention is to provide an improved safety arrangement for an aircraft. Another object of the invention is to provide improved and reliable method for determining type of the landing surface for an aircraft.

The object of the invention can be achieved by the features of independent claims. The invention relates to a safety arrangement according to claim 1. In addition the invention relates to a method for determining a type of the landing surface for an aircraft according to claim 11, an aircraft, such as an amphibious aircraft according to claim 17, and a computer program product for determining a type of the landing surface for an aircraft according to claim 18.

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

According to an embodiment of the invention, a safety arrangement for an aircraft is configured for detecting a type of landing surface (such as water or solid ground, e.g. suitable for runway). Advantageously the safety arrangement is for amphibious aircraft.

The safety arrangement comprises two transceivers, where the first transceiver is configured to operate or transmit on first electromagnetic wavelength and the second transceiver is configured to operate or transmit on second electromagnetic wavelength differing from said first wavelength.

The safety arrangement may comprise also more than two transceivers which also operate or transmit on their own separate electromagnetic wavelength. Thereby, all transceivers transmit a signal on separate electromagnetic wavelengths.

The transceivers are configured to transmit or emit the said electromagnetic wavelengths essentially towards said landing surface (essentially downwards or towards landing area, when said aircraft is essentially in normal flying state or position) and at least one of transceivers is configured to receive the reflections of said electromagnetic wavelengths. Advantageously, one of transceivers is configured to receive (detect and measure) all the reflections of said electromagnetic wavelengths, which were transmitted. It is also possible that all transceivers are configured to receive their own transmitting wavelengths. Advantageously, every transceiver is configured to receive all the reflections of all transmitted electromagnetic wavelengths, in order to obtain more accurate detection and/or enhance the operation or reliability of the safety arrangement.

The safety arrangement comprises also determining means (implemented e.g. by suitable software or data processing unit/means) for determining the type of the landing surface based on the properties of said at least two electromagnetic wavelengths when reflected from said landing surface and for outputting a signal indicating (representing) the type of the determined landing surface.

If the safety arrangement comprises more than two transceivers, the safety arrangement may advantageously determine the type of the landing surface based on the properties of more than two transmitted wavelengths.

The safety arrangement thereby determines the landing surface type based on determining the properties of the reflected signals. The properties of the electromagnetic signal change when it is reflected from the landing surface. The properties of reflected electromagnetic signal change differently depending on the type of the landing surface (=reflecting surface), namely ground (runway) or water. Furthermore, the properties of reflected electromagnetic signal change also depending on the wavelength. These changes in properties of the transmitted electromagnetic wavelength include at least:

timing=distance from the reflecting surface
    intensity of the reflection/absorption of the reflecting surface
    intensity variations
    polarization: whether the reflection is from the solid ground of water.

Timing of the electromagnetic wavelengths is related to the distance of a reflecting surface. The reflecting surface usually corresponds to the landing surface, namely ground or water. However, the reflecting surface may be different for different electromagnetic wavelengths. This means that on shallow water, one wavelength is reflected from surface of water, and one is reflected from the bottom (ground) of the water, or in case of area with vegetation near landing runway, from ground and treetops (or plant tops).

Intensity of the reflection depends mainly on the absorption of the different electromagnetic wavelengths transmitted by the transceivers. However, also the distance has some effect on the reflection intensity. Also the quality of the reflecting surface (roughness, irregularities, angle) effects on the reflection intensity.

Intensity variations of the reflected electromagnetic wavelengths may be caused by several reasons. A fluctuation in the intensity of the reflected signal is usually due to surface waves when reflected from the surface of water.

Polarization of the reflection depends on the properties of the reflecting surface. Polarization is different depending on whether the signal is reflected from the solid surface or surface of water.

After determining the type of the landing surface based on the properties of said two reflections of the electromagnetic wavelengths, the determining means outputs a signal indicating the type of the determined landing surface. The outputted signal distinguishes whether the landing surface is ground or water. The outputted signal may be electrical signal, or signal may be in form of a sound, light, or vibration.

According to an embodiment of the invention the safety arrangement comprises detecting means for detecting position of a landing gear. In such case the safety arrangement detects the position, or configuration, of a landing gear.

According to an embodiment of the invention, the safety arrangement comprises determining means for determining whether landing gear is in correct or incorrect position which corresponds the respective type of landing surface. In such case the safety arrangement determines whether landing surface is ground or water and detects configuration of the landing gear (whether it is in or out) and determines whether the landing gear is in correct position for the type of the landing surface. When landing on ground or runway, the landing gear should be out (extended) and when landing on water, the landing gear should be retracted.

According to an embodiment of the invention the safety arrangement comprises controller for outputting signal, such as sound, light, and/or tactile/vibration effect, indicating the type of the determined landing surface and/or whether the landing gear is in correct or incorrect position corresponding the type of the landing surface based on the determined type of the landing surface and the position of the landing gear. Advantageously, the safety arrangement provides a signal when landing gear configuration is in improper/incorrect position. Advantageously the signal may be an automatic signal to automatic controllers. Also advantageously the signal may be a signal for the pilot.

According to an embodiment of the invention the safety arrangement comprises a detecting means for detecting that landing is iniated based on by detecting at least one of the following: flaps in landing position, engine power level, and/or velocity, and/or velocity transition from a cruising speed to a landing speed, altitude, descending speed (variometer). Advantageously, the safety arrangement activates itself when detecting that landing is iniated based on as said above.

According to an embodiment of the invention the first electromagnetic wavelength is 400-700 nm and second electromagnetic wavelength is 800-2200 nm.

According to another embodiment of the invention the first electromagnetic wavelength is 3 m-3 mm (equal to frequency 100 MHz-90 GHz) and second electromagnetic wavelength is 400-2200 nm. In this embodiment, the first wavelength corresponds to the typical distance measuring device operating on a radar frequencies (or wavelengths).

According to another embodiment of the invention the safety arrangement comprises third transceiver configured to operate on wavelength 380-500 nm.

According to another embodiment of the invention the safety arrangement determines the surface type by comparing the distance measurements between the said two different wavelengths.

According to another embodiment of the invention the safety arrangement determines the surface type based on the absorption of the two different wavelengths by the reflecting surface.

According to another embodiment of the invention, a method for determining a type of the landing surface for an aircraft, comprises the steps:
transmitting two different electromagnetic wavelengths essentially towards said landing surface,
receiving the reflections of said electromagnetic wavelengths
determining the properties of said two electromagnetic wavelengths reflected from said landing surface,
determining the type of the landing surface based on the properties of said two electromagnetic wavelengths reflected from said landing surface According to an embodiment of the invention, the method comprises a step of detecting the position of a landing gear and determining whether the landing gear is in correct or incorrect position corresponding the type of landing surface.

According to an embodiment of the invention, the method comprises a step of outputting a signal, such as sound, light, and/or tactile/vibration effect, which indicates whether the landing gear is in correct or incorrect position corresponding the type of the landing surface based on the determined type of the landing surface and the position of the landing gear.

According to an embodiment of the invention, the method comprises a step of determining the surface type by comparing:
the distance measurements between the said two different wavelengths and/or
the absorption between the two different wavelengths by the reflecting surface.

According to an embodiment of the invention an aircraft, such as an amphibious aircraft, comprises the said safety arrangement.

Another embodiment of the invention is a computer program product for determining a type of the landing surface for an aircraft, which comprises program code means that are stored on a computer-readable medium, and which code means are arranged to perform the steps of the method according to any embodiment of the invention, when the program is run on a computer.

Another embodiment of the invention is that the safety arrangement comprises a warning means if the safety arrangement is not working properly.

The present invention, and its embodiments, offer advantages over the known prior art, such as enhanced reliability of the determining the type of the landing surface, and more simple structure of the safety arrangement. For example, one advantage is that the invention is not susceptible to dirt on the transceivers, because of similar effect of the dirt on both transceivers and thereby the transceivers maintaining equal relative intensities. The enhanced reliability yields from utilizing at least two different types of electromagnetic wavelengths. The present invention, and its embodiments, offer also improved safety for operating amphibious aircraft and for landing on different types of landing surfaces.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

Next the invention will be described in greater detail with reference to exemplary embodiments.

DETAILED DESCRIPTION

One example of one embodiment of the present invention is a safety arrangement for an amphibious aircraft, which safety arrangement is configured for detecting the type of a landing surface.

The safety arrangement comprises two transceivers, and the first transceiver is configured to operate or transmit on first electromagnetic wavelength and the second transceiver is configured to operate or transmit on second electromagnetic wavelength differing from said first wavelength.

The transceivers are configured to transmit essentially towards said landing surface (meaning essentially downwards or towards landing area) and at least one of them is configured to receive the reflections of said electromagnetic wavelengths.

The safety arrangement comprises determining means for determining the type of the landing surface based on the properties of reflections of said two electromagnetic wavelengths when reflected from said landing surface, and for outputting a signal indicating the type of the determined landing surface.

Advantageously the safety arrangement determines whether the landing surface is solid surface (ground/runway) or water.

The outputted signal may be electric, sound, light, or vibration signal. Advantageously, in case of the electrical signal, it is connected to other systems.

Figure 1:
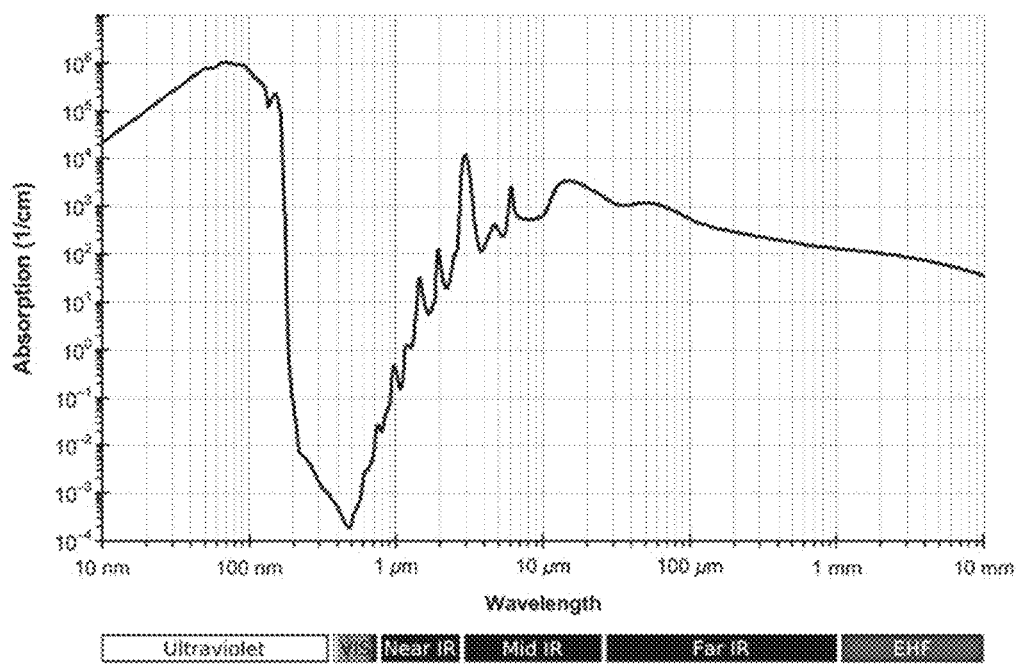
FIG. 1 illustrates an absorption spectrum of electromagnetic radiation for liquid water (Source: http://en.wikipedia.org/wiki/File:Absorption_spectrum_of_liquid_water.png, retrieved 15.01.2014)

The operation of the safety arrangement is based on that different electromagnetic wavelengths are reflected differently from a certain type of landing surface. Therefore, the type of the landing surface can be distinguished from another type by determining the properties of reflection of the transmitted electromagnetic wavelength. FIG. 1 illustrates an absorption curve of electromagnetic wavelengths for liquid water. In FIG. 1 is illustrated that visible light has relatively small absorption in the water. However infrared wavelengths have significantly bigger absorption in the water. When absorption is bigger, the reflection is weaker. The reflection from the water for infrared wavelengths is very weak, but for visible light relatively stronger when compared to infrared wavelengths.

The absorption of electromagnetic wavelengths for solid ground is so that visible light has relatively weaker reflectivity when compared with infrared wavelengths.

Based on the properties of reflections of at least two different electromagnetic wavelengths, it is possible to determine the type of the landing surface. The properties of the reflection in determining the type of the landing surface is at least one of the following:
 timing=distance from the reflecting surface
 intensity of the reflection/absorption of the reflecting surface
 intensity variations
 polarization The present invention utilizes on one part for example the different absorption of different wavelengths in water (as shown if FIG. 1): When one of the transmitted wavelengths is selected to be between 400-700 nm (first wavelength) and second wavelength to be between 800-2200 nm, the difference between the intensity of the reflection indicates reliably whether surface below is water. For example in the case of the water, the reflection of the second wavelength (800-2200) is weaker than first wavelength, because of stronger absorption in water for second wavelength.

Figure 2:
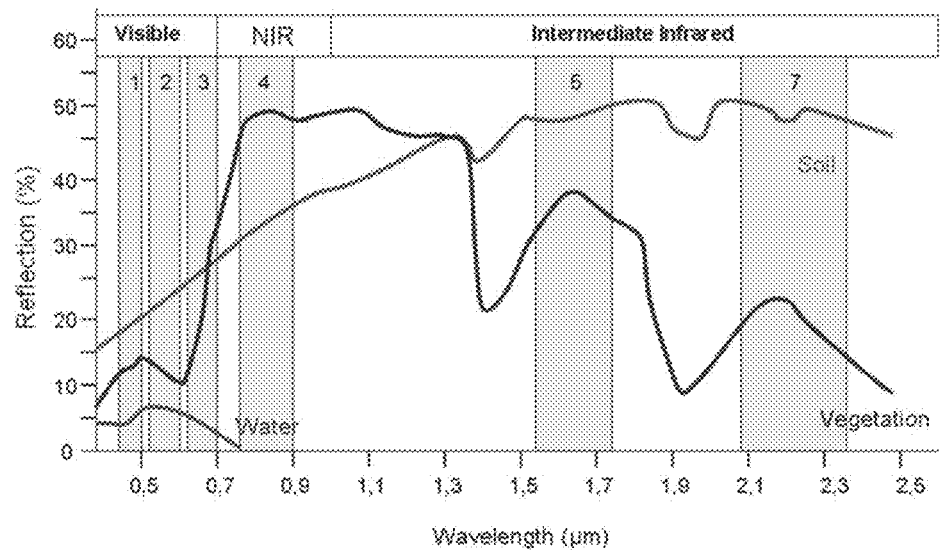
FIG. 2 illustrates a reflectance spectrum of soil (=ground), water, and vegetation for comparison. Source: Siegmund, Menz 2005 with modifications, (Retrieved 15.01.2014: http://www.seos-projecteu/modules/remotesensing/remote-sensing-c01-p05.html)
Figure 3A:
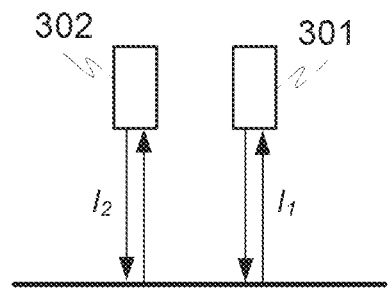
FIGS. 3A-3D illustrate a principle of an exemplary arrangement and method for determining a surface type according to an advantageous embodiment of the invention.
Figure 3B:
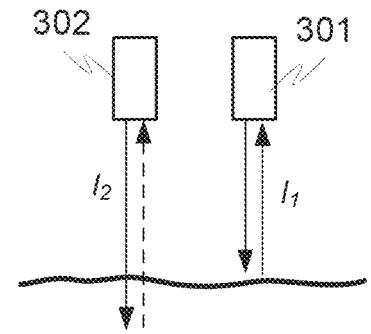
Figure 3C:
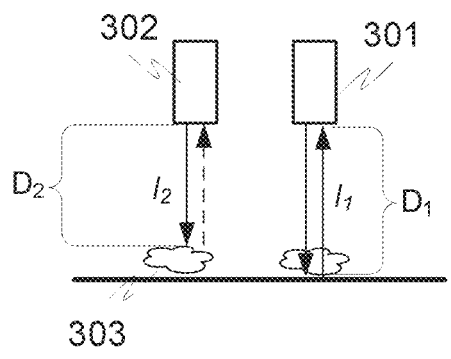
Figure 3D:
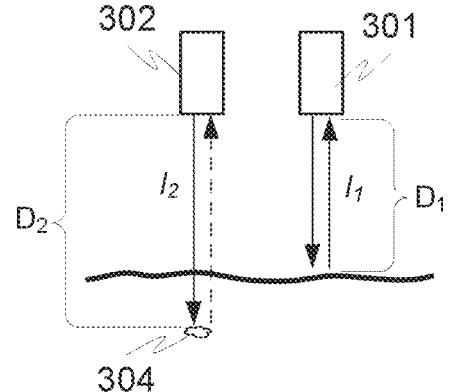

Furthermore wavelengths between 800-2200 (second wavelength) are reflected from soil (solid ground) more strongly than wavelengths between 400-700 nm (first wavelength), as can be seen in FIG. 2. This difference between reflection intensities indicates whether the surface below is ground.

Another example of an embodiment of the present invention is that the safety arrangement comprises detecting means for detecting position of a landing gear.

Another example of an embodiment of the present invention is that the safety arrangement comprises determining means for determining if landing gear is in correct or incorrect position which corresponds the type of landing surface.

Another example of an embodiment of the present invention is that the safety arrangement comprises controller for outputting signal, such as sound, light, and/or tactile/vibration effect, indicating the type of the determined landing surface and/or whether the landing gear is in correct or incorrect position corresponding the type of the landing surface based on the determined type of the landing surface and the position of the landing gear.

Another example of an embodiment of the present invention is that the safety arrangement comprises detecting means for detecting that landing is iniated based on by detecting at least one of the following: flaps in landing position, engine power level, and/or velocity.

Another example of an embodiment of the present invention is that the first electromagnetic wavelength is 400-700 nm and second electromagnetic wavelength is 800-2200 nm.

Another example of an embodiment of the present invention is that the first electromagnetic wavelength is 3 m-3 mm and second electromagnetic wavelength is 400-2200 nm.

Another example of another embodiment of the present invention is that it comprises a known laser distance measuring system as a first transceiver and the second transceiver is operating on different electromagnetic wavelength from laser distance measuring system. Advantageously the second transceiver operates on IR wavelength between 800-2200 nm.

It is also possible that instead of using laser distance measuring system as a first transceiver, the first transceiver is radar type distance measuring system operating on radar (microwave) wavelengths.

Another example of an embodiment of the present invention is that the safety arrangement comprises third transceiver configured to operate on wavelength 380-500 nm. The use of this wavelength range can be utilized for determining the presence of vegetation near the landing area and/or eliminating the effect of vegetation on first two wavelengths when determining the type of landing surface. The vegetation can include any vegetation including trees, bushes, plants, grass among other things. From FIG. 2 can be seen that reflection for vegetation between wavelengths 380-500 is stronger than for other landing surface types.

FIGS. 3A-3D illustrate a principle of an exemplary arrangement 300 and method 310, 320 based on the intensity measurements and method based on the distance measurements 330, 340 for determining a surface type according to an advantageous embodiment of the invention, wherein the arrangement comprises a first transceiver 301 operated on first wavelength and a second transceiver 302 operated on second wavelength differing from said first wavelength, as discussed elsewhere in this document.

In the example 310 the surface type is a hard ground, such as a tarmac runway, and the both wavelengths are reflected from the surface of the ground. When the wavelengths are selected properly, the intensity I2 of the reflection of the second wavelength is greater than the intensity I1 of the reflection of the first wavelength.

In the example 320 the surface type is water, whereupon the second wavelength is essentially not reflected at all (is absorbed) or only minor portion of it is reflected (this is the case for example if the second wavelength is in the near infrared area), whereas the first (typically much more shorter wavelength) is again reflected from the surface of the water. Now in the case of water the intensity I2 of the reflection (if any) of the second wavelength is negligible in relation to the intensity I1 of the reflection of the first wavelength.

Thus the surface type (hard ground or water) can be determined based on the mutual intensity differences of said first and second reflected wavelengths so that if the intensity I2 of the reflection of the second wavelength is greater than the intensity I1 of the reflection of the first wavelength, the type of the landing surface is determined to be as hard ground, and vice versa, if the intensity I2 of the reflection of the second wavelength is smaller than the intensity I1 of the reflection of the first wavelength, the type of the landing surface is determined to be as water.

In the example 330 the surface type is a hard ground, such as a tarmac runway, and in addition there is also vegetation 303 in the landing area or in the final of the runway (extension of the runway), such as grass, bush or trees. In this case, when the wavelengths are selected properly, the second wavelength I2 will reflect already on the top portion of the vegetation, whereupon the first wavelength I1 will reflect again from the hard ground, and the distances measured via said reflections differs from each other.

In the example 340 the surface type is water, whereupon the second wavelength I2 is essentially not reflected at all (is absorbed) from the surface of the water, but it is reflected from the particles 304 inside the water or even from the bottom of the water, whereas the first wavelength I1 is again reflected from the surface of the water, whereupon the distances measured via said reflections differs again from each other but in opposite direction than in the case of hard ground.

In the examples of 330, 340 the distances D1 and D2 of the reflected wavelengths are measured, and based on the distance difference the surface type can be determined so that if the distance D2 measured via the reflection of the second wavelength is shorter than the distance D1 measured via the reflection of the first wavelength, the type of the landing surface is determined to be as hard ground, and vice versa, if the distance D2 measured via the reflection of the second wavelength is longer than the distance D1 measured via the reflection of the first wavelength, the type of the landing surface is determined to be as water.

Another example of an embodiment of the present invention is that the safety arrangement determines the surface type by comparing the distance measurements between the said two different wavelengths.

Another example of an embodiment of the present invention is that the arrangement determines the surface type based on the absorption of the two different wavelengths by the reflecting surface Another example of an embodiment of the present invention is that the method comprises a step of determining the surface type by comparing the distance measurements between the said two different wavelengths and/or by comparing the absorption between the two different wavelengths by the reflecting surface (reflection intensities).

Next more detailed examples of the operation of the present invention:

1) An amphibious airplane is flying and is about to land on a runway of an airport. The safety arrangement is operating during flight, and two transceivers are transmitting on different, separate electromagnetic wavelengths towards landing surface (=runway). At least one transceiver is configured to receive the reflections on said transmitted electromagnetic wavelengths. The safety arrangement then determines with determining means, based on the properties of reflections of two electromagnetic wavelengths, that landing surface is solid ground and outputs a signal that indicates that landing surface is solid ground. The safety arrangement also detects that the landing gear is extended (out) which is correct position for landing in this case. The controller of the safety arrangement outputs a signal that indicates that the landing gear is in correct position.

2) As explained in example 1) above, but the safety arrangement detects that the landing gear is retracted (inside), and that is incorrect position for landing on the runway. The controller of the safety arrangement outputs a signal that indicates that the landing gear is in incorrect position.

3) An amphibious airplane is flying and is about to land on a water. The safety arrangement is operating during flight, and two transceivers are transmitting on different, separate electromagnetic wavelengths towards landing surface (=water). One transceiver, which is configured to receive the reflections on said transmitted electromagnetic wavelengths. The safety arrangement then determines with determining means, based on the properties of reflections on two electromagnetic wavelengths, that landing surface is water and outputs a signal that indicates that landing surface is water. The safety arrangement also detects that the landing gear is retracted (inside) which is correct position for landing in this case. The controller of the safety arrangement outputs a signal that indicates that the landing gear is in correct position.

4) As explained in example 3) but the safety arrangement detects that the landing gear is extended (out), and that is incorrect position for landing on water. The controller of the safety arrangement outputs a signal that indicates that the landing gear is in incorrect position.

The invention has been explained above with reference to the aforementioned embodiments, and several advantages of the invention have been demonstrated. It is clear that the invention is not only restricted to these embodiments, but comprises all possible embodiments within the spirit and scope of the inventive thought and the following patent claims.

The invention claimed is:

1. A safety arrangement for an aircraft, especially for amphibious aircraft, said safety arrangement being configured for determining a type of landing surface, characterized in that the arrangement comprises:

two transceivers (301, 302),
  where the first transceiver (301) is configured to operate on a first electromagnetic wavelength,
  where the second transceiver (302) is configured to operate on a second electromagnetic wavelength differing from said first wavelength, and
  wherein the first electromagnetic wavelength is 400-700 nm and the second electromagnetic wavelength is 800-2200 nm, or wherein the first electromagnetic wavelength is 3 m-3 mm and the second electromagnetic wavelength is 400-2200 nm,
  where said transceivers (301, 302) are configured to transmit said electromagnetic wavelengths essentially towards said landing surface and at least one of the two transceivers is configured to receive the reflections of said electromagnetic wavelengths, means for performing the determination of the type of the landing surface based on the properties of said two electromagnetic wavelengths when reflected from said landing surface, and for outputting a signal indicating the type of the determined landing surface.

2. The safety arrangement of claim 1, wherein the safety arrangement comprises means for performing the detection of a position of a landing gear and means for performing the determination if the landing gear is in a correct or an incorrect position corresponding to the type of landing surface.

3. The safety arrangement of claim 1, wherein the safety arrangement comprises a controller for outputting a signal, such as sound, light, tactile or vibration effect, indicating the type of the determined landing surface or whether the landing gear is in a correct or an incorrect position corresponding to the type of the landing surface based on the determined type of the landing surface and the position of the landing gear.

4. The safety arrangement of claim 1, wherein the safety arrangement comprises means for performing the detection that landing is initiated based on at least one of the following: flaps in landing position, engine power level, descending speed, altitude, velocity.

5. The safety arrangement of claim 1, wherein the safety arrangement comprises third transceiver configured to operate at a wavelength between 380-500 nm.

6. A safety arrangement of claim 1, wherein the arrangement determines the surface type by comparing the distance (D1, D2) measurements between said two different wavelengths.

7. The safety arrangement of claim 1, wherein the arrangement determines the surface type based on the absorption of the two different wavelengths by the reflecting surface by comparing the intensities (I1, I2) of the reflected wavelengths.

8. An aircraft, characterized in that it comprises the safety arrangement according to claim 1.

9. The safety arrangement of claim 1, wherein the first electromagnetic wavelength is 400-700 nm and the second electromagnetic wavelength is 800-2200 nm.

10. The safety arrangement of claim 1, wherein the first electromagnetic wavelength is 3 m-3 mm and second electromagnetic wavelength is 400-2200 nm.

11. A method for determining a type of the landing surface for an aircraft, characterized in that the method comprises the following steps:
    transmitting two different electromagnetic waves having different wavelengths essentially towards said landing surface, wherein the first electromagnetic wavelength is 400-700 nm and the second electromagnetic wavelength is 800-2200 nm, or wherein the first electromagnetic wavelength is 3 m-3 mm and second electromagnetic wavelength is 400-2200 nm,
    receiving the reflections of said electromagnetic wavelengths
    determining the properties of said two electromagnetic wavelengths reflected from said landing surface,
    determining the type of the landing surface based on the properties of said two electromagnetic wavelengths reflected from said landing surface.

12. The method of claim 11, wherein the position of a landing gear is detected and determined whether the landing gear is in a correct or an incorrect position corresponding to the type of landing surface and outputting a signal is outputted, sound, light, tactile or vibration effect, indicating whether the landing gear is in the correct or the incorrect position corresponding to the type of the landing surface based on the determined type of the landing surface and the position of the landing gear.

13. The method of claim 11, wherein the surface type is determined by comparing the distance (D1, D2) measurements between said two different wavelengths or the surface type is determined based on the absorption between the two different wavelengths by the reflecting surface.

14. The method of claim 11, wherein the first electromagnetic wavelength is 400-700 nm and the second electromagnetic wavelength is 800-2200 nm.

15. The method of claim 11, wherein the first electromagnetic wavelength is 3 m-3 mm and second electromagnetic wavelength is 400-2200 nm.

16. A computer program product for determining a type of the landing surface for an aircraft, characterized in that it comprises program code means stored on a non-transitory computer-readable medium, which code means are arranged to perform the steps of the method defined in claim 9, when the program is run on a computer.

17. The method of claim 12, wherein the surface type is determined by comparing the distance (D1, D2) measurements between said two different wavelengths by the reflecting surface.

* * * * *